US007010540B2

(12) United States Patent
Sturms

(10) Patent No.: US 7,010,540 B2
(45) **Date of Patent: *Mar. 7, 2006**

(54) SYSTEM AND METHOD FOR MAINTAINING A USER'S STATE WITHIN A DATABASE TABLE

(75) Inventor: James Sturms, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/801,013

(22) Filed: Mar. 15, 2004

(65) Prior Publication Data

US 2004/0210598 A1 Oct. 21, 2004

Related U.S. Application Data

(63) Continuation of application No. 09/602,410, filed on Jun. 23, 2000, now Pat. No. 6,728,721.

(51) Int. Cl.
*G06F 17/30* (2006.01)

(52) U.S. Cl. .................. 707/101; 707/102; 707/103 X; 707/104.1

(58) Field of Classification Search .................... 707/3, 707/103, 101, 102, 104, 203, 2, 103 X, 104.1; 709/217, 224; 345/839

See application file for complete search history.

(56) References Cited

U.S. PATENT DOCUMENTS 5,481,704 A * 1/1996 Pellicano ....................... 707/5
5,682,489 A * 10/1997 Harrow et al. .............. 715/839
5,778,354 A * 7/1998 Leslie et al. .................... 707/2
5,826,253 A * 10/1998 Bredenberg .................... 707/2
5,852,821 A * 12/1998 Chen et al. .................... 707/2
6,073,168 A * 6/2000 Mighdoll et al. ........... 709/217
6,081,809 A * 6/2000 Kumagai ................. 707/104.1
6,125,360 A * 9/2000 Witkowski et al. ............ 707/2
6,178,425 B1 * 1/2001 Brodersen et al. .......... 707/101
6,185,614 B1 * 2/2001 Cuomo et al. .............. 709/224
6,233,584 B1 * 5/2001 Purcell ................... 707/103 X
6,535,872 B1 * 3/2003 Castelli et al. ................. 707/3
6,745,209 B1 * 6/2004 Holenstein et al. ......... 707/203
2001/0016843 A1 * 8/2001 Olson et al. ................... 707/3

FOREIGN PATENT DOCUMENTS

WO WO 96/37837 11/1996

* cited by examiner

*Primary Examiner*—Thuy N. Pardo
(74) *Attorney, Agent, or Firm*—Ronald M. Anderson

(57) ABSTRACT

A system and method are provided for delivering batches of data to a client, while maintaining the client's state in the accessed database. The system and method eliminate the need for a web server to maintain the location of any given client within a database. Accordingly, the web server operates with greater efficiency, because it is freed from having to maintain the state of any given client within a database and need not create or maintain a partitioned database. Maximum and minimum values of any data previously requested and received by the client are maintained. These maximum and minimum values are later used within a novel set of Structured Query Language (SQL) statements to indicate the user's state within the database. By maintaining minimum and maximum reference values, the user's state within the accessed database can be maintained without storing any information on the web server. The next and previous batches are successfully obtained by comparing these stored reference values to the database so that the user can quickly move between adjacent batches of records. The invention provides a simple and elegant means for maintaining a user's state within a database, without requiring the use of a web server's resources or the creation of a partitioned database.

27 Claims, 8 Drawing Sheets

TABLE: MyList

250

| | Title | ID |
|---|---|---|
| 250 | Ulysses | 100 |
| 252 | The Great Gatsby | 100 |
| 254 | Brave New World | 102 |
| 258 | Catch-22 | 104 |
| 260 | The Grapes of Wrath | 101 |
| 262 | Sons and Lovers | 105 |
| 264 | The Grapes of Wrath | 106 |
| 266 | The Grapes of Wrath | 105 |
| 268 | I, Claudius | 107 |
| 270 | An American Tragedy | 108 |
| 272 | Slaughterhouse Five | 109 |
| 274 | Invisible Man | 110 |
| 276 | Animal Farm | 111 |
| 278 | As I Lay Dying | 112 |
| 280 | Tropic of Cancer | 113 |
| 282 | On the Road | 114 |
| 284 | On the Road | 115 |
| 286 | On the Road | 116 |
| 288 | On the Road | 117 |

*Fig. 2b*

400 SELECT TOP 20 * FROM MyList

402 ORDER BY MyList.Title, MyList.ID

*Fig. 4*

```
500    SELECT TOP 20 *FROM MyList
504    WHERE
506              (MyList.Title > Current_Maximum_Title)
508                        OR
510              (MyList.Title = Current_Maximum_Title AND
                           MyList.ID > Current Maximum ID)
512    ORDER BY MyList.Title, MyList.ID
```

*Fig. 5*

```
600  SELECT TOP 20 * FROM MyList
602          (SELECT TOP 20 * FROM MyList
604          WHERE
606                  (MyList.Title<Current_Minimum_Title)
608                          OR
610                  (MyList.Title = Current_Minimum_Title AND
                             MyList.ID<Current_Minimum_ID)
612          ORDER BY MyList.Title DESC, MyList.ID DESC)
614  ORDER BY MyList.Title, MyList.ID
```

*Fig. 6*

SYSTEM AND METHOD FOR MAINTAINING A USER'S STATE WITHIN A DATABASE TABLE

RELATED APPLICATION

This application is a continuation of prior application Ser. No. 09/602,410 filed Jun. 23, 2000, now U.S. Pat. No. 6,728,721 the benefit of the filing date of which is claimed under 35 U.S.C. § 120.

TECHNICAL FIELD

The present invention relates to a system and method for managing a database table, and more particularly relates to a system and method for using a specialized query format to maintain a record of a user's state within the database table.

BACKGROUND OF THE INVENTION

One of the primary benefits provided by the Internet is widespread access to data maintained by data providers in centralized databases. For example, a wholesaler of retail goods may provide retail outlets access to its inventory database or a public library may provide borrowers access to its online card catalog. Users at the retail outlets can access the database to determine product attributes such as product descriptions, product availability, and product pricing. Library borrowers could determine the availability of books. Such databases can be very large, which presents obstacles to effective data distribution. With large databases, a policy decision must be made by the data provider as to how to deliver data to the user over the Internet.

One approach to providing data to a user is by allowing the user to download the entire contents of the database to the user's local computer. However, this approach has various problems. One problem is that the user must have system resources capable of processing the large database with acceptable performance. Some large databases are simply too large to permit the user to use the database with ease and efficiency and may ultimately deter users from exploiting the benefits of the database. Another problem with this approach is that the user may not have a tool for effectively browsing the database after it has been downloaded. In this case, the database becomes a burdensome and unwieldy mass of data reducing its usefulness to the user. Network bandwidth is another problem with this approach. Downloading data over a conventional modem takes an unacceptably long time.

Another common approach is to deliver the data to the user in batches. With this approach, the data provider will partition the data into batches and deliver the batches, one at a time, to the end user. The end user is, thus, provided with a manageable portion of the database. Maintaining a partitioned database can be difficult in applications where the database must be regularly updated or modified. Moreover, in order to permit the user to browse between adjacent batches, the data provider must maintain a record as to which batch the user has accessed. This approach also requires that the data provider maintain records of each user's activity with respect to the database. That is, the data provider must maintain a record of the user's "state" or location within the database.

There is a need in the art for a means for providing users with remote access (e.g., via the Internet) that is more efficient and more effective than the above-described existing approaches. The system should provide good end-user performance by delivering batches (i.e., partial data sets) to a user and should provide good server performance by eliminating the necessity to maintain partitioned databases and/or state information on the user. The system should also be capable of being implemented without significant modifications of existing databases.

SUMMARY OF THE INVENTION

The present invention solves the problems of the prior art by providing a system and method for delivering batches of data to a client, while maintaining the client's state in the accessed database. The system and method eliminates the need for a web server to maintain the location of any given client within a database. Accordingly, the web server operates with greater efficiency, because it is freed from having to maintain the state of any given client within a database and need not create or maintain partitioned databases.

The typical internet database searching arrangement involves a database server, a web server and an end user's computer (client computer). The database server maintains the data to which the end user seeks access. The web server acts an intermediary and permits access to the database server's database via the internet. The end user's computer will be running an application, such as a web browser, which will permit the end user to communicate with the web server and query the database on the database server.

The present invention enables a web server to deliver to the client computer a web site with a query entry field. The end user can enter a query in the field and submit the query to the web server. The web server will, in turn, access the database server and return a first batch of records satisfying the search to the end user. The first batch can be configured with a "next" button which will allow the user to access the next group of records from the database. Once the user has received the next group of records from the database, the user will also be provided with a "previous" button by which the user may access the adjacent, previously delivered batch of records.

The present invention accomplishes batch fetching by implementing a novel Structured Query Language (SQL) statement. The SQL statements reference minimum and maximum reference values from previously received batches of records.

By maintaining minimum and maximum reference values on the client's computer, the user's state within the accessed database can be maintained without storing any information on the web server. The next and previous batches are successfully obtained by comparing these stored reference values to the database so that the user can quickly move between adjacent batches of records. Thus, the invention provides a simple and elegant solution to the identified problem.

The various aspects of the present invention may be more clearly understood and appreciated from a review of the following detailed description of the disclosed embodiments and by reference to the drawings and claims.

BRIEF DESCRIPTION OF THE DRAWINGS

FIG. 2*b* is a block diagram depicting the primary components of an exemplary database table.

FIG. 4 is a pseudo-code listing of a Structured Query Language (SQL) statement for requesting a first batch of data from a database in an exemplary embodiment of the present invention.

FIG. 5 is a pseudo-code listing of an SQL statement for requesting a next batch of data from a database in an exemplary embodiment of the present invention.

FIG. 6 is a pseudo-code listing of an SQL statement for requesting a previous batch of data from a database in an exemplary embodiment of the present invention.

DETAILED DESCRIPTION

The present invention solves the problems of the prior art by providing a system and method for delivering batches of data to a client, while maintaining the client's state in the accessed database. The system and method eliminates the need for a web server to maintain the location of any given client within a database. Accordingly, the web server operates with greater efficiency, because it is freed from having to maintain the state of any given client within a database and need not create or maintain partitioned databases.

In an exemplary embodiment of the present invention, maximum and minimum values of any data previously requested and received by the client are maintained. These maximum and minimum values are later used within a novel set of Structured Query Language (SQL) statements to indicate the user's state within the database. By maintaining minimum and maximum reference values on the user's computer, the user's state within the accessed database can be maintained without storing any information on the web server. The next and previous batches are successfully obtained by comparing these stored reference values to the database so that the user can quickly move between adjacent batches of records. Thus, the invention provides a simple and elegant means for maintaining a user's state within a database, without requiring the use of a web server's resources or the creation of partitioned databases.

An Exemplary Operating Environment

Figure 1:
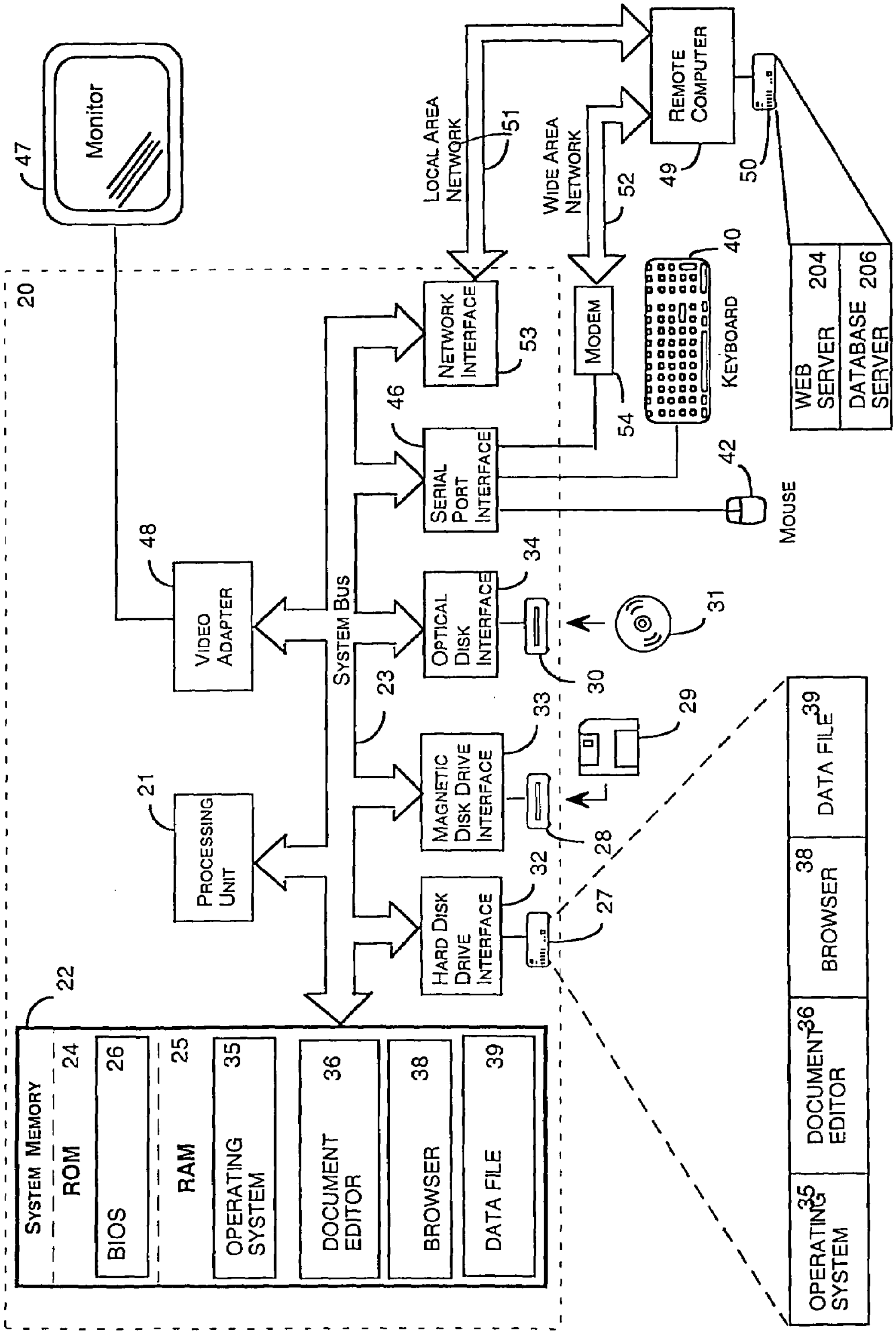
FIG. 1 is a block diagram of a computer system that provides the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more document editors 36, an Internet browser 38, and any number of other program modules, such as a data file 39 which could be maintained by document editor 36 or Internet browser 38 for storing, among other things, a user's preferences. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The memory storage device 50 may include stored program modules that are executable by the remote computer 49. For example, the memory storage device 50 may include web server functionality 204 or database server functionality 206. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer. 20, or portions thereof, may be stored in the remote memory storage device. It will be appreciated that the network connections shown are exemplary and other means of establishing a communications link between the computers may be used.

An exemplary embodiment of the present invention is represented by the "MICROSOFT INTERNET EXPLORER" and HTML source file editors including the "MICROSOFT WORD" word processing application program, the "MICROSOFT EXCEL" spreadsheet application program, the "MICROSOFT ACCESS" database application program, and the "MICROSOFT POWERPOINT" graphical presentation application program. However, it should be understood that the present invention can be implemented by various program modules and/or application programs for use with various operating systems.

An Exemplary Database Access Model

Figure 2A:
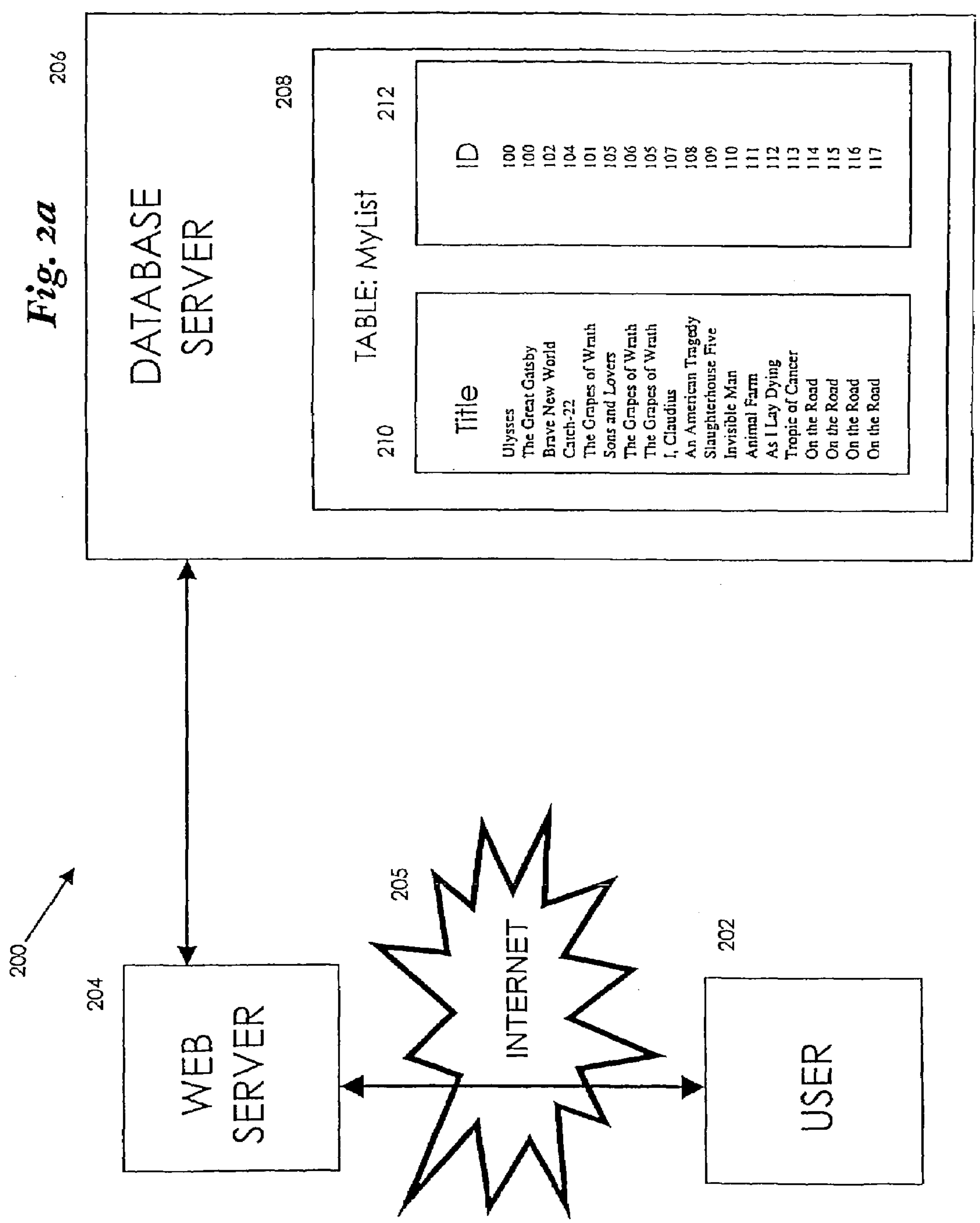
FIG. 2*a* is a block diagram depicting the primary components of an exemplary system for providing access to databases via the Internet.

FIG. 2*a* depicts a block diagram of an exemplary database access model. In this model, a user 202 can gain access to a table 208 (Table: MyList) stored on a database server 206. The user will typically access the database server 206 via a connection over the internet 205 to a web server 204. This model may be used by any entity providing access to data by remote or local users. For example, a public library may maintain a table of its inventory. In the example of FIG. 2*a*, the table is labeled "MyList" 208 and includes a list of two-field records including the title field 210 and the ID field 212. The public library could maintain the database sever 206 and could provide access to remote users 202 via the web server 204. Turning now to FIG. 2*b*, Table: MyList 208 is shown with records 250–288. The title field of each record is associated with an ID field. For example the title field containing the entry "Ulysses" is associated with ID number "100" and the title field containing "On the Road" of record 282 is associated with ID number "114." Notably, records 260, 264, and 266, and records 282, 284, 286, and 288 respectively have duplicate title fields. However, because each of these records has a unique ID field, the records can be distinguished from one another. That is, each record sharing an ID field with another record has a distinct title. Each record sharing a title with another record has a distinct ID field. Because the title fields or ID fields of these records are different, however, these records are distinguishable from one another.

Figure 2C:
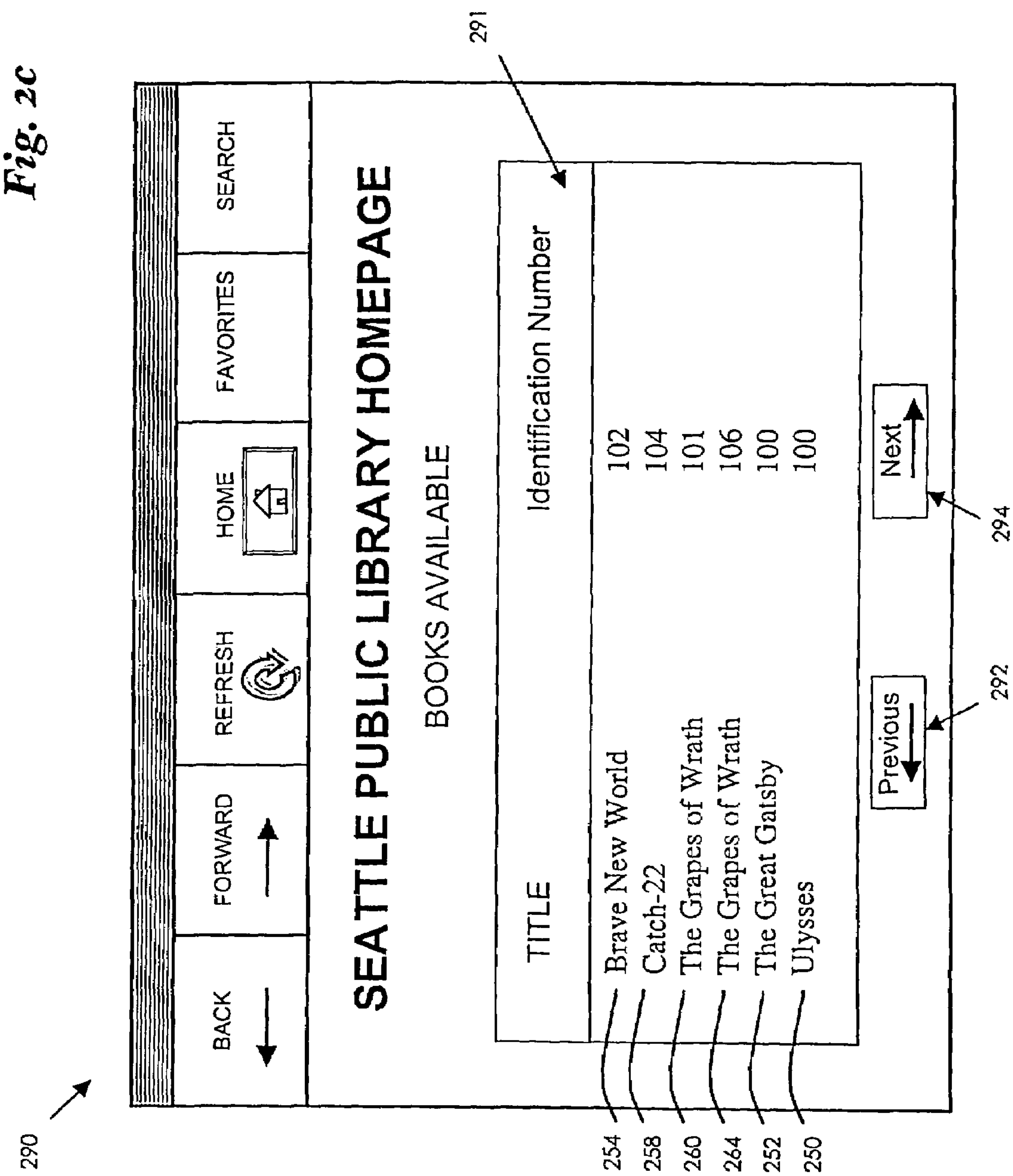
FIG. 2*c* is a block diagram depicting the primary components of an exemplary web page for providing access to databases via the Internet.

FIG. 2*c* depicts an exemplary web browser 290 that might be employed by a user 202. For the data access model 200 of FIG. 2*a*, a user 202 will typically utilize a browser running on a computer that is connected via the internet to the web server 204 (FIG. 2*a*). In FIG. 2*c*, the web server provides the user access to a web site that includes a data window 291. The data window 291 displays a batch of data contained in Table: MyList 208 to the user 202. The user can traverse the list by clicking on either the previous button 292 or the next button 294. The previous button will show the records in the Table: MyList 208 that are ordered in Table: MyList before the current batch displayed in the data window 291. Similarly, the next button 294 will display the batch of data that is ordered after the batch of data currently displayed in the data window 291.

In the example of FIG. 2*c*, the records displayed in data window 291 are sorted by alphabetical order according to the title field. That is, the title field of record 254 contains an entry ("Brave New World") that is "less than" the corresponding entry of record 258 ("Catch-22") in alphabetical order and is therefore displayed before record 258. In the case of records 260 and 264 which have identical title fields, the records are ordered by ID field in ascending order.

Of course, if the current batch (i.e., the batch represented in the data window 291) is the first batch of Table: MyList 208, the previous button 292 can be shaded to indicate its unavailability. The same applies for the last batch in Table: MyList 208, with respect to the next button 294.

An Exemplary Method for Traversing a Table

For the purposes of this discussion, the user's state is used to mean the user's position within the relevant table with respect to the other records in the table. For example, the records shown in the data window 291 of FIG. 2*c* represent the first batch in Table: MyList 208. That is, there are no records previous to this batch, but a next batch exists with respect to this batch.

Figure 3:
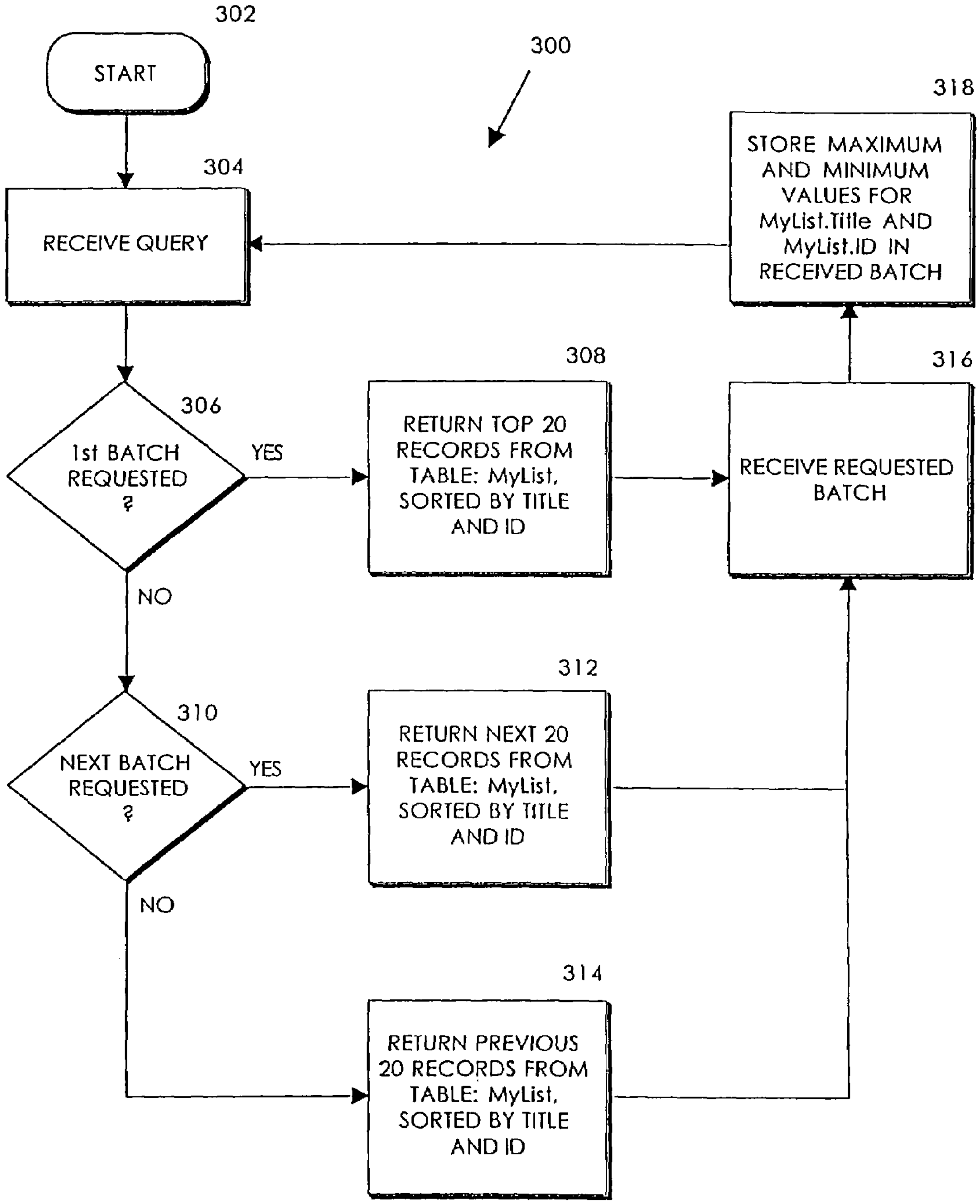
FIG. 3 is a flowchart depicting a method for maintaining a user's state within a database in an exemplary embodiment of the present invention.

Turning now to FIG. 3, an exemplary method for traversing Table: MyList 208 is depicted. The method 300 starts at step 302 and proceeds to step 304. At step 304, the web server 204 (FIG. 2*a*) receives a query from the user 202 (FIG. 2*a*). As described in connection with FIGS. 2*a–c*, the query can be of any form, but indicates to the web server 204 that the user 202 seeks access to a table within the database server 206. When the user first accesses the database server 206 through web server 204, the user must necessarily access a first batch of data. At decision block 306, a determination is made as to whether the data requested is the first batch of data. If the requested data is the first batch, the method branches to step 308.

The determination at step 308 need not be made by the web server 202. On the contrary, a novel set of batch request instructions can be used to differentiate a first batch request from a next or a previous batch request. That is, the batch request instructions identify different batches, so that the web server need not differentiate between these kinds of requests. In an exemplary embodiment of the present invention, a first batch request from a user 202 is different from a previous or next batch request so that the web server 204 need not recognize a first batch request, nor make a determination whether a batch request is a first, a next, or a previous batch request.

At step 308, the first twenty records from Table: MyList 208 are returned to the user and sorted by title and ID, as described in connection with FIG. 2*c*. Although the step indicates that the first twenty records are returned, any number of records could be returned.

Returning to decision block 306, if the requested batch is not the first batch, then the method branches to decision block 310. At 310 a determination is made as to whether the next batch records have been requested. As described above, the determination of step 310 can be made by the use of a novel set of request instructions and need not be made by the web server 202. As described in connection with FIG. 2*c*, the user can request the next batch of records by hitting the next button 294. If the requested batch is the next batch, then the method branches to step 312 and the next twenty records from Table: MyList is returned to the user. These records can be sorted by title and ID as described in connection with FIG. 2*c*.

Returning now to decision block 310, if a determination is made that the requested batch of records is not the next batch of records (i.e., the requested batch of records is the previous batch of records), then the method branches to step 314. At step 314 the previous twenty records from Table: MyList are returned to the user. As described above in connection with FIG. 2c, the user can request the previous batch of records by clicking on previous button 292. As discussed above, the previous batch of records can be sorted by title and ID for presentation to the user.

The method branches from steps 308, 312 and 314 to step 316. At step 316, the user receives the requested batch. The method then proceeds to step 318. At step 318 the user's computer can store the maximum and minimum values contained in the title fields and ID fields of the received batch of records. Because the maximum and minimum values for these fields have been stored a determination of which records in Table: MyList 208 are to be returned for the next or previous batches can be determined quickly and efficiently. These maximum and minimum values can be stored by the user, by the web server, or by any other conventional storage means. In any case, each query from the user for a batch of records from the database server 206 subsequent to the first batch requested, can include these maximum and minimum values. By accessing these maximum and minimum values, the web server can quickly determine the requested batch of records without maintaining a record itself of the users state within the Table: MyList 208.

After the maximum and minimum values for the title and ID fields have been stored the method returns to step 304 and awaits a request from the user for another batch of records. FIGS. 4–6 provide a detailed discussion of an exemplary method for using the stored maximum and minimum value to facilitate a user's traversal of Table: MyList 208. FIG. 4 depicts pseudo-code representing the means by which an exemplary method of retrieving batches of records retrieves the first batch. The pseudo-code represented in FIGS. 4–6 are provided in standard structured query language (SQL) format. Queries in SQL format are well known to those skilled in the computer arts and is a database language used for creating, maintaining, and viewing database data.

Returning now to FIG. 4, line 400 is a SELECT clause that indicates that the query is requesting records from a table. In the case of line 400, the query is requesting twenty records from the table entitled (MyList). Because there are no conditions placed on the retrieved records, the first twenty records will be retrieved. Alternatively, the first 20 records could be specified by use of a "SET ROWCOUNT 20" statement, as is well known in the art. The asterisk specifies that all fields of the retrieved records should be retrieved. As is well known, any one or more fields of the records could be specified. Line 402 orders the returned batch of twenty records first by the title field and second by the ID field. As described in connection with FIG. 2c, where the title fields are identical, the identification number fields will be used to order the records in the returned batch.

Turning now to FIG. 5, lines of pseudo-code are presented for fetching the next batch of records from Table: MyList 208. Line 500 includes the SELECT statement described in FIG. 4. As mentioned above, the first 20 records could also be specified by use of a "SET ROWCOUNT 20" statement. The asterisk specifies that all fields of the retrieved records should be retrieved. Line 504 includes a WHERE clause which indicates that the query includes a condition that must be met by the retrieved batch of records. In the case of the pseudo-code of FIG. 5, the WHERE clause can be satisfied by meeting the requirements of lines 506 or 510. The OR clause of line 508 indicates that either condition may be met to satisfy the WHERE clause.

The condition contained in line 506 is that the title field in any returned record is greater than the Current_Maximum_Title stored as described in FIG. 3. Line 510 includes two subconditions which must both be met in order for the condition of line 510 to be met. The first subcondition in line 510 requires that the title of the next batch of records is equal to the Current_Maximum_Title. This subcondition is triggered when all of the titles in the next batch of twenty records are equal to the Current_Maximum_Title stored. In addition to the title field subcondition, line 510 includes a second subcondition that the ID field is greater than the Current_Maximum_ID stored as described in FIG. 3. In the case where all of the titles in the next batch of twenty records are equal to the Current_Maximum_Title stored, the condition of line 506 fails but the second subcondition of line 510 accesses the ID field and retrieves those records for which the ID field is greater than the Current_Maximum_ID stored. Obviously, the subcondition technique could be used to access records with any number of fields, by utilizing multiple subconditions.

Line 512 includes an ORDER BY statement that returns the retrieved batch sorted by title and ID fields, as described above.

In effect, the pseudo-code of lines 500–512 seeks a batch of records that include titles greater than the maximum title previously received. If the available records include twenty records with titles that are equal to the Current_Maximum_Title, then the pseudo-code analyzes the available records for ID fields that are greater than the Current_Maximum_ID field stored. As described above, there must be some characteristic that distinguishes each record from all other records in the table. That is, if the table contains two-field records having the same title and the same ID, then the system described will work less effectively.

Turning now to FIG. 6, a nested SQL query is provided for returning a previous batch of records. The SELECT clause and the ORDER BY clause at steps 600 and 614, respectively, operate in the manner described in connection with FIGS. 4 and 5. However, the query embodied in the pseudo-code lines 602–612 are nested within the SQL query of lines 600–614. At line 602, the SELECT clause indicates that twenty records are sought from Table: MyList. The conditions in the WHERE clause of the line 604 are contained in line 606 and 610. Although these conditions operate in a similar manner as described in connection with the conditions of FIG. 5, the conditions that must be met by the retrieved batch of data are compared with the Current_Minimum_Title stored and the Current_Minimum_ID stored. Because the previous batch of records is sought, the SQL query includes a condition at line 606 that the title fields of the returned batch of records are less than the Current_Minimum_Title stored. If twenty or more records are available in the Table: MyList, then the subcondition at line 610 compares the ID fields of the available records to the Current_Minimum_ID stored and returns records having an ID field less than the current minimum stored.

The ORDER BY clause at line 612 is different from the other order by clauses described above, in that it includes a DESC clause. The DESC clause requires that the records in the return batch are ordered in descending order. This is helpful so that the batch of records that is retrieved are the records that are previous to—but adjacent to—the current batch of records.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

We claim:

1. A method for delivering batches of data to a client, while maintaining a user's state within a database table, the method comprising the steps of:

receiving a request for a first batch of records to be retrieved from the database table maintained by a database server;

retrieving the first batch of records from the database server;

determining a maximum value for at least one field in the first batch of records;

receiving a request for a second batch of records;

determining whether the request for the second batch of records was for a next batch of data, wherein the request for the second batch of records specifies a value for the at least one field that has a specific relationship relative to the maximum value for the at least one field in the first batch of records, to indicate whether the request is for the next batch of data; and in response to a determination that the request for the second batch of records was for the next batch of data, based on the value specified in the request for the second batch of records being greater than the maximum value for said at least one field in the first batch of records, retrieving the next batch of data from the database server.

2. The method of claim 1, wherein the request for the second batch of records is a Structured Query Language (SQL) statement.

3. The method of claim 2, further comprising the step of storing the maximum value for inclusion in a subsequent request for a batch of records.

4. The method of claim 2, wherein the SQL statement has the form:

```
SELECT TOP20*FROM Table
  WHERE
  (Table.Field1>Current Maximum Field1)
    OR
  (Table.Field1=Current Maximum Field1 AND
  Table.Field2>Current Maximum Field2); and
```

wherein a Table clause represents the name of the database table, a Current Maximum Field1 represents a maximum value of a Field1 field in previously received records, and a Current Maximum Field2 represents a maximum value of a Field2 field in previously received records.

5. The method of claim 1, further comprising the step of providing the user with a previous button operative for initiating the request for a second batch of records.

6. The method of claim 1, further comprising the step of providing the user with a next button operative for initiating the request for a second batch of records.

7. A system for delivering batches of database records to a client, while maintaining a user's state within a database table, comprising:

a database server operative for maintaining the database table, which has a plurality of database records;

a client computer, operative for requesting successive batches of the database records from the database server and presenting the batches of database records to the user, where each successive batch of database records requested can comprise a next batch of database records, relative to a last batch of database records requested by the client computer;

a web server operative for retrieving a batch of database records from the database server and for providing the batch of database records to the client computer, said web server determining whether successive batches of database records are the next batch of database records, relative to the last batch of database records requested by the client computer;

wherein the client computer accesses at least one field value contained in the last batch of database records retrieved to determine a maximum value for said at least one field, said maximum value being provided to the web server by the client computer; and wherein the web server is further operative to determine whether to retrieve the next batch of database records from the database server, based on the maximum value of said at least one field value contained in the last batch of database records retrieved, said web server retrieving the next batch of database records from the database server if the next batch of database records contains a value for said at least one field that is greater than the maximum value of said at least one field in the last batch of database records retrieved.

8. The system of claim 7, wherein the web server does not maintain a record of the user's state within the database table.

9. The system of claim 8, wherein the database server does not maintain a record of the user's state within the database table.

10. The system of claim 9, wherein the database server does not create a partitioned database.

11. The system of claim 7, wherein the client computer does not maintain a record of the user's state within the database table.

12. A computer-readable medium having computer-executable instructions for delivering batches of data from a database server to a client, maintaining a user's state within a database table, by performing steps comprising:

receiving a request for a first batch of records to be retrieved from the database table maintained by the database server;

providing the first batch of records to the client, wherein the first batch of records has a maximum value for at least one field;

receiving a request from the client for a second batch of records to be retrieved from the database table, said request for the second batch of records specifying a value for the at least one field;

determining if the request for the second batch of records from the database table was for a next batch of data, relative to the first batch of records, wherein the value for the at least one field specified in the second request has a specific relationship relative to the maximum value for the at least one field in the first batch of records, so that if the value specified is determined to be greater than the maximum value of said at least one field for the first batch of records, the request for the second batch of records is determined to be for the next batch of data; and in response to a determination of whether to provide the next batch of data, providing the second batch of records to the client as requested.

13. The computer-readable medium of claim 12, wherein the step of determining does not require the database server to maintain a record of the first batch of records provided to the client.

14. The computer-readable medium of claim 12, wherein the database server does not create a partitioned database.

15. A method for delivering batches of data to a client, while maintaining a user's state within a database table, the method comprising the steps of:

receiving a request for a first batch of records to be retrieved from the database table maintained by a database server;

retrieving the first batch of records from the database server;

determining a minimum value for at least one field in the first batch of records;

receiving a request for a second batch of records;

determining whether the request for the second batch of records was for a previous batch of data, wherein the request for the second batch of records specifies a value for the at least one field that has a specific relationship relative to the minimum value for the at least one field in the first batch of records, to indicate whether the request is for the previous batch of data; and in response to a determination that the request for the second batch of records was for the previous batch of data, based on the value specified in the request for the second batch of records being less than the minimum value for said at least one field in the first batch of records, retrieving the previous batch of data from the database server.

16. The method of claim 15, wherein the request for the second batch of records is a Structured Query Language (SQL) statement.

17. The method of claim 16, further comprising the step of storing the minimum value for inclusion in a subsequent request for a batch of records.

18. The method of claim 16, wherein the SQL statement has the form:

```
SELECT TO 20*FROM
  (SELECT TOP 20*FROM Table
  WHERE
  (Table.Field1>Current Maximum Field1)
    OR
  (Table.Field1=Current Minimum Field1 AND
  Table.Field2>Current Minimum Field2)
  ORDER BY Table.Field1 DESC, Table.Field2 DESC);
    and
```

wherein a Table clause represents the name of the database table, a Current Minimum Field1 represents a minimum value of a Field1 field in previously received records, and a Current Minimum Field2 represents a minimum value of a Field2 field in previously received records.

19. The method of claim 15, further comprising the step of providing the user with a previous button operative for initiating the request for a second batch of records.

20. A system for delivering batches of database records to a client, while maintaining a user's state within a database table, comprising:

a database server operative for maintaining the database table, which has a plurality of database records;

a client computer, operative for requesting successive batches of the database records from the database server and presenting the batches of database records to the user, where each successive batch of database records requested can comprise a previous batch of database records, relative to a last batch of database records requested by the client computer;

a web server operative for retrieving a batch of database records from the database server and for providing the batch of database records to the client computer, said web server determining whether successive batches of database records are the previous batch of database records, relative to the last batch of database records requested by the client computer;

wherein the client computer accesses at least one field value contained in the last batch of database records retrieved to determine a minimum value for said at least one field, said minimum value being provided to the web server by the client computer; and wherein the web server is further operative to determine whether to retrieve the previous batch of database records from the database server, based on the minimum value of said at least one field value contained in the last batch of database records retrieved, said web server retrieving the previous batch of database records from the database server if the previous batch of database records contains a value for said at least one field that is less than the minimum value of said at least one field in the last batch of database records retrieved.

21. The system of claim 20, wherein the web server does not maintain a record of the user's state within the database table.

22. The system of claim 21, wherein the database server does not maintain a record of the user's state within the database table.

23. The system of claim 22, wherein the database server does not create a partitioned database.

24. The system of claim 20, wherein the client computer does not maintain a record of the user's state within the database table.

25. A computer-readable medium having computer-executable instructions for delivering batches of data from a database server to a client, maintaining a user's state within a database table, by performing steps comprising:

receiving a request for a first batch of records to be retrieved from the database table maintained by the database server;

providing the first batch of records to the client, wherein the first batch of records has a minimum value for at least one field;

receiving a request from the client for a second batch of records to be retrieved from the database table, said request for the second batch of records specifying a value for the at least one field;

determining if the request for the second batch of records from the database table was for a previous batch of data, relative to the first batch of records, wherein the value for the at least one field specified in the second request has a specific relationship relative to the minimum value for the at least one field in the first batch of records, so that if the value specified is determined to be less than the minimum value of said at least one field for the first batch of records, the request for the second batch of records is determined to be for the previous batch of data; and in response to a determination of whether to provide the previous batch of data, providing the second batch of records to the client as requested.

26. The computer-readable medium of claim 25, wherein the step of determining does not require the database server to maintain a record of the first batch of records provided to the client.

27. The computer-readable medium of claim 25, wherein the database server does not create a partitioned database.

* * * * *

UNITED STATES PATENT AND TRADEMARK OFFICE

CERTIFICATE OF CORRECTION

PATENT NO. : 7,010,540 B2
APPLICATION NO. : 10/801013
DATED : March 7, 2006
INVENTOR(S) : James Sturms It is certified that error appears in the above-identified patent and that said Letters Patent is hereby corrected as shown below:

On the Title Page Item -56- under “Foreign Patent Documents”, line 1, after “11/1996” insert -- G06F11/14 --.

In column 5, line 10, after “computer” delete “.”.

In column 5, line 38, delete “sever” and insert -- server --, therefor.

In column 11, line 41, in Claim 18, after “Table.Field1” delete “>” and insert -- < --, therefor.

In column 11, line 44, in Claim 18, after “Table.Field2” delete “>” and insert -- < --, therefor.

Signed and Sealed this

Twenty-first Day of July, 2009

JOHN DOLL
*Acting Director of the United States Patent and Trademark Office*